United States Patent
Liang et al.

(10) Patent No.: US 9,014,458 B2
(45) Date of Patent: Apr. 21, 2015

(54) VALUABLE DOCUMENT IDENTIFICATION METHOD AND SYSTEM

(75) Inventors: Tiancai Liang, Guangzhou (CN); Zongbin Mu, Guangzhou (CN); Dahai Xiao, Guangzhou (CN); Tingting Li, Guangzhou (CN)

(73) Assignee: GRG Banking Equipment Co., Ltd., Guangzhou (CN)

( * ) Notice: Subject to any disclaimer, the term of this patent is extended or adjusted under 35 U.S.C. 154(b) by 0 days.

(21) Appl. No.: 13/879,019

(22) PCT Filed: Apr. 13, 2012

(86) PCT No.: PCT/CN2012/073974
§ 371 (c)(1),
(2), (4) Date: May 2, 2013

(87) PCT Pub. No.: WO2012/155729
PCT Pub. Date: Nov. 22, 2012

(65) Prior Publication Data
US 2014/0205177 A1 Jul. 24, 2014

(30) Foreign Application Priority Data
May 19, 2011 (CN) .......................... 2011 1 0130431

(51) Int. Cl.
*G06K 9/00* (2006.01)
*G07D 7/04* (2006.01)
(Continued)

(52) U.S. Cl.
CPC .............. *G06K 9/00469* (2013.01); *G07D 7/04* (2013.01); *G07D 7/205* (2013.01); *G07D 7/00* (2013.01); *G07D 7/164* (2013.01); *G07D 7/20* (2013.01)

(58) Field of Classification Search
None
See application file for complete search history.

(56) References Cited

U.S. PATENT DOCUMENTS 5,832,112 A * 11/1998 Funada et al. ................ 382/181
7,235,805 B2 * 6/2007 Mukai ...................... 250/559.11
(Continued)

FOREIGN PATENT DOCUMENTS

| CN | 1488065 A | 4/2004 |
|---|---|---|
| CN | 1867948 A | 11/2006 |

(Continued)

OTHER PUBLICATIONS

European Search Report regarding a European counterpart application (12785979.1), Jan. 27, 2014.

*Primary Examiner* — Nancy Bitar
(74) *Attorney, Agent, or Firm* — Kilpatrick Townsend & Stockton LLP (57) ABSTRACT

A valuable document identification method and system are provided. The method comprises, detecting features in different space ranges of a valuable document, and obtaining multi-source information $\Omega=\{X_i, X_j, \ldots, X_n\}$, wherein $X_i \cap X_j \neq \phi$, or $X_i \cap X_j \neq \phi$ and $X_i <=> X_j$; labeling the space position of $X_j$ with $X_i$ according to semantic constraints of $X_i$ and $X_j$, and obtaining position constraints $\Psi_{ij}(x, y)$; extracting a characteristic value $f_i$ from $X_i$, and extracting a characteristic value $f_j$ from $X_j$ according to the position constrains $\Psi_{ij}(x, y)$; determining whether $f_i$, $f_j$ meet the characteristic criteria of the valuable document, if yes, then receiving the valuable document, or else, rejecting the valuable document. The method enables improved reliability and robustness of the valuable document identification system.

13 Claims, 5 Drawing Sheets

(51) Int. Cl.
*G07D 7/20* (2006.01)
*G07D 7/00* (2006.01)
*G07D 7/16* (2006.01)

(56) References Cited

U.S. PATENT DOCUMENTS

2004/0047106 A1\* 3/2004 Maruyama .................... 361/143
2005/0110209 A1   5/2005 Mukai 2007/0189595 A1\* 8/2007 Giering ........................ 382/137

FOREIGN PATENT DOCUMENTS

| CN | 101504781 A | 8/2009 |
| CN | 101536047 A | 9/2009 |
| CN | 102289857 A | 12/2011 |
| EP | 1172773 A1 | 1/2002 |
| EP | 1589494 A1 | 10/2005 |
| JP | 2010026992 A | 2/2010 |

\* cited by examiner

VALUABLE DOCUMENT IDENTIFICATION METHOD AND SYSTEM

The present application is a National Stage application of PCT international application PCT/CN2012/073974, filed on Apr. 13, 2012 which claims the priority of Chinese Patent Application No. 201110130431.6, titled "Method and system for Identifying Valuable Document", filed with the Chinese State Intellectual Property Office (CSIPO) on May 19, 2011, both of which are incorporated herein by reference in their entirety.

FIELD OF THE INVENTION

The present invention relates to the field of valuable document identifying technique, and in particular to a method and system for identifying valuable document based on multi-source information cooperation.

BACKGROUND OF THE INVENTION

Figure 1:
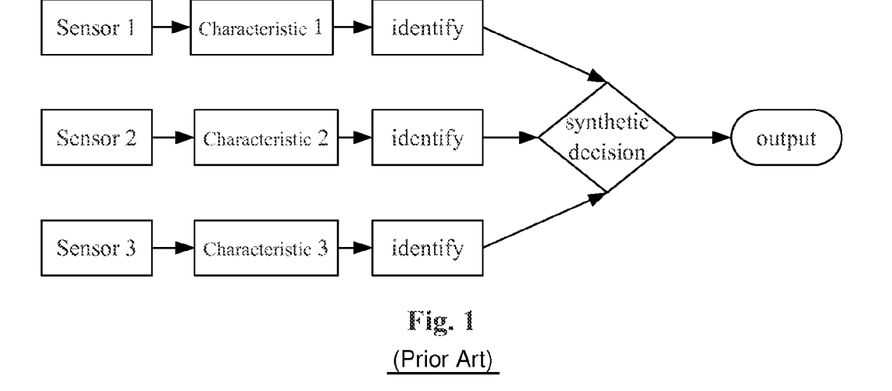
FIG. 1 is a schematic structural diagram of a system for identifying valuable document based on result integration in prior art.

In FIG. 1, a schematic structural diagram of an existing system for identifying valuable document based on result integration is shown. The system for identifying valuable document collects characteristics of the valuable document by a sensor 1, a sensor 2 and a sensor 3 to obtain a characteristic 1, a characteristic 2 and a characteristic 3. Then characteristics are identified respectively to obtain identification results, and the identification results are integrated together according to a "logic AND" policy. An identification result indicating that "the valuable document is legal" is output if the identification result of each characteristic is legal; else an identification result indicating that "the valuable document is illegal" is output.

The existing system for identifying valuable document has following disadvantages. Although multiple sensors are employed to collect various characteristics of the valuable document, context relation or constraint among individual characteristics is unconsidered during the identifying process, a separate process is performed on each of the characteristics respectively, and the identification results of characteristics are integrated together simply according to the "logic AND" policy when the result is outputted. Different characteristics can not be validated and checked mutually, the reliability of the system is poor; moreover, no context constraint is established among characteristics, so that the final judging result can only be obtained by judge and calculate all the characteristics, causing calculation redundancy.

SUMMARY OF THE INVENTION

An embodiment of the present invention provides a method and system for identifying valuable document to improve reliability and robustness of the system for identifying valuable document.

A method for identifying valuable document provided by an embodiment of the present invention includes:

S1. Detecting characteristics of the valuable document in different spatial scales to obtain multi-source information $\Omega = \{X_i, X_j, \ldots, X_n\}$;

wherein $X_i$ indicates the characteristic in the i-th space scale, $X_j$ indicates the characteristic in the j-th space scale, $1 \leq i \leq n$, $1 \leq j \leq n$, and $i \neq j$; semantic constraints on $X_i$ and $X_j$ are: $X_i \cap X_j \neq \phi$;

S2. Determining a spatial location of $X_j$ by using $X_i$ to obtain a location constraint $\Psi_{ij}(x,y)$ according to the semantic constraints on $X_i$ and $X_j$;

S3. Extracting a feature value $f_i$ from the $X_i$; and extracting a feature value $f_j$ from the $X_j$ according to the location constraint $\Psi_{ij}(x,y)$, checking whether $f_i$ and $f_j$ conform to the semantic constraint on $X_i$ and $X_j$, judging that $f_i$ and $f_j$ are legal if yes; else outputting a rejection identification, wherein $f_i$ is an optimal characteristic of the i-th spatial scale, and $f_j$ is an optimal characteristic of the j-th spatial scale;

S4. Judging whether $f_i$ and $f_j$ conform to a characteristic standard of the valuable document; outputting the reception identification to receive the valuable document if yes; else outputting the rejection identification to reject the valuable document.

A system for identifying valuable document provided by an embodiment of the present invention includes:

a multi-source information detecting module adapted for detecting characteristics of the valuable document in different spatial scales to obtain multi-source information $\{X_i, X_j, \ldots, X_n\}$; where $X_i$ indicates the characteristic in the i-th space scale, $X_j$ indicates the characteristic in the j-th space scale, $1 \leq i \leq n$, $1 \leq j \leq n$, and $i \neq j$; semantic constraints on $X_i$ and $X_j$ are: $X_i \cap X_j \neq \phi$;

a cooperative sensing module adapted for determining a spatial location of $X_j$ by using $X_i$ according to the semantic constraints on $X_i$ and $X_j$ to obtain a location constraint $\Psi_{ij}(x,y)$; extracting a feature value $f_i$ from $X_i$; and extracting a feature value $f_j$ from $X_j$ according to the location constraint $\Psi_{ij}(x,y)$, checking whether $f_i$ and $f_j$ conform to the semantic constraint on $X_i$ and $X_j$, determining that $f_i$ and $f_j$ are legal if yes; else outputting a rejection identification, wherein $f_i$ is an optimal characteristics of the i-th spatial scale, and $f_j$ is an optimal characteristics of the j-th spatial scale; and a cooperative decision module adapted for judging whether $f_i$ and $f_j$ conform to a characteristic standard of the valuable document; outputting a reception identification to receive the valuable document if yes; else outputting a rejection identification to reject the valuable document.

By implementing embodiments of the present invention, the following advantages can be obtained:

The method and the system for identifying valuable document provided by the embodiment of the present invention obtain the multi-source information and establish the context scene of the multi-source information by detecting characteristics of the valuable documents in different spatial scales; the collaborative process is performed on the multi-source information of the valuable document by using the context constraint of the multi-source information during the identifying process, and thus the applicability of the system is expanded, the information of the detected object is obtained with higher accuracy and reliability, the consistent explanation and description of the detected object is established more accurately, the reliability and the robustness of the system for identifying valuable document is enhanced, and the calculation efficiency of the system is improved.

BRIEF DESCRIPTION OF THE DRAWINGS

The invention will be further understood with reference to drawings which are only a part of the specification and explain the invention in conjunction with the embodiment of the present invention. The invention is not limited by the drawings. In the drawings.

DETAILED DESCRIPTION OF THE INVENTION

The technical solution in the embodiment of the present invention will be described clearly and completely in conjunction with the drawings in the embodiment of the present invention hereinafter. Obviously, the described embodiments are only a part but not all of the embodiments of the present invention. All the other embodiments obtained by those skilled in the art without creative work based on the embodiment in the present invention pertain to the scope of protection of the present invention.

Figure 2:
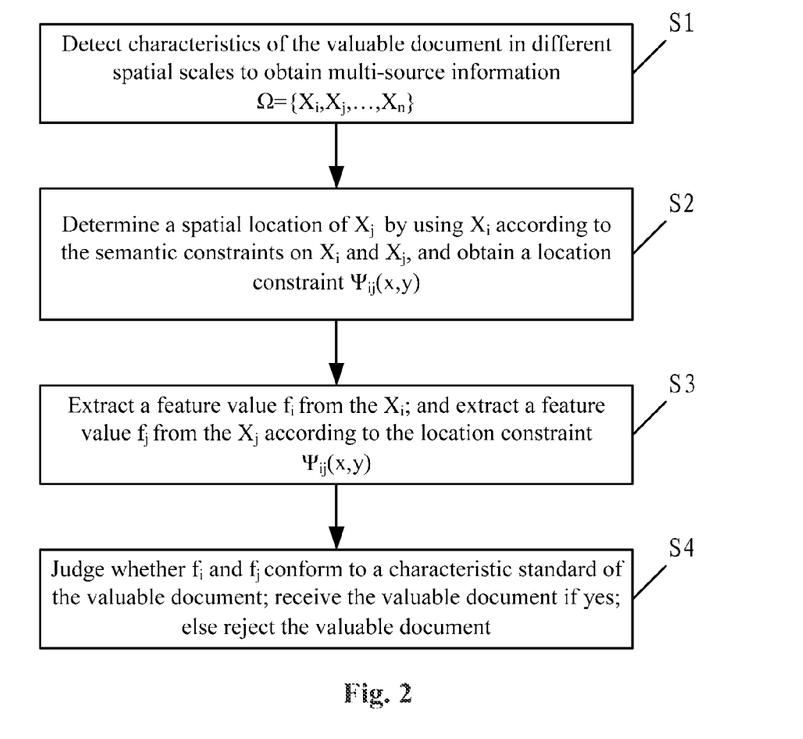
FIG. 2 is a schematic flow chart of a method for identifying valuable document provided by a first embodiment of the present invention.

Reference is made to FIG. 2, which is a schematic flow chart of a method for identifying valuable document provided by a first embodiment of the present invention, and the method includes the following steps:

S1. Detecting characteristics of the valuable document in different spatial scales to obtain multi-source information $\Omega=\{X_i, X_j, \ldots, X_n\}$, where $X_i$ indicates the characteristic in the i-th space scale, $X_j$ indicates the characteristic in the j-th space scale, $1 \leq i \leq n$, $1 \leq j \leq n$, and $i \neq j$; semantic constraints on $X_i$ and $X_j$ are:
$X_i \cap X_j \neq \phi$, or $X_i \cap X_j \neq \phi$ and $X_i <=> X_j$;

S2. Determining a spatial location of $X_j$ with $X_i$ according to the semantic constraints on $X_i$ and $X_j$ to obtain a location constraint $\Psi_{ij}(x,y)$;

S3. Extracting a feature value $f_i$ from the $X_i$; and extracting a feature value $f_j$ from the $X_j$ according to the location constraint $\Psi_{ij}(x,y)$;

S4. Judging whether $f_i$ and $f_j$ conform to a characteristic standard of the valuable document; receiving the valuable document if yes; else rejecting the valuable document.

In the above step S1, as required by practical application, the characteristics of the valuable document in different spatial scales can be detected by a specific array of sensors to obtain multi-source information. The multi-source information includes spectral information, magnetic information, material information and other physical information.

Figure 3:
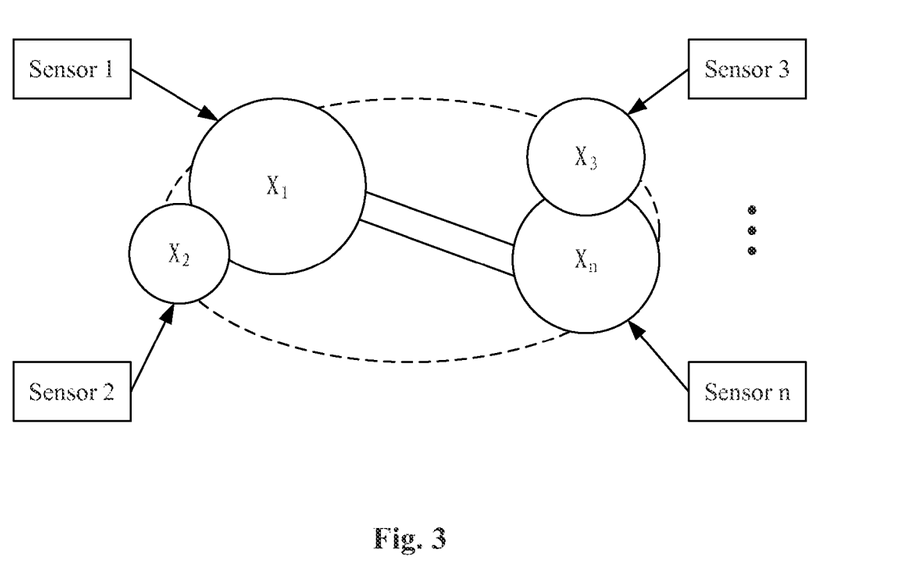
FIG. 3 is a schematic diagram of a process for obtaining multi-source information provided by an embodiment of the present invention.

The characteristic of the valuable document has the feature of "global cooperation and local competition", the characteristics in different spaces not only keep relatively independent, but also keep a certain semantic constraint in the context (scene) for describing the valuable document: redundancy, complementation or correlation. Individual characteristics work cooperatively in the context circumstance for describing the valuable document, consisting integral description of the valuable document. As shown in FIG. 3, the characteristics of the valuable document in different spatial scales is detected by a sensor 1, a sensor 2, a sensor 3, . . . , and a sensor n to obtain respectively the characteristics $X_1, X_2, X_3, \ldots,$ and $X_n$. There exists redundancies between $X_1$ and $X_2$, and between $X_3$ and $X_n$, there exists correlation between $X_1$ and $X_n$, and they cooperatively constitute the consistent description or explanation of the valuable document. This procedure obtains the information of the valuable document in different spatial scales by building the array of sensors, for providing multi-source information for the following cooperative sensing process.

The above steps S2 and S3 are the cooperative sensing processes. Spatial characteristics of the valuable document keep relatively independent locally, which have integrity for describing the nature thereof; and keep "cooperative" relationship globally and conform to a certain semantic constraint. By establishing the context scene of individual spatial characteristics, the optimal characteristics of individual spaces are extracted according to the idea of "local competition and global cooperation", considering completely the context constraint on individual characteristics, during the identification process. The optimal characteristic refers to the feature value that is legal and most adequate for representing the nature of this space. In the above step S3, the feature value $f_i$ extracted from $X_i$ and the feature value $f_j$ extracted from $X_j$ are both optimal characteristic.

The above step S4 is the cooperative decision process, the decision sorting is performed based on practical application scene according to the optimal characteristics of individual spaces obtained during the cooperative sensing process. Locally, when one feature value is determined as an illegal input, the match of the other spatial characteristics is stopped, a rejection identification is output to reject to identify the valuable document; and globally, only when all the feature values are determined as legal, the identification result is output.

The method for identifying valuable document provided by a second embodiment of the present invention will be described in detail only by taking the multi-source information $\Omega$ including spectral information $X_1$, magnetic information $X_2$ and material information $X_3$ as an example in conjunction with FIGS. 4 to 6 hereinafter.

In this embodiment, the multi-source information of the valuable document is defined as: spectral information $X_1$, magnetic information $X_2$ and material information $X_3$. Specifically, the 2-dimensional spectral information $X_1$ is collected by a spectral sensor, the 1-dimensional magnetic information $X_2$ is collected by a magnetic sensor, and the 1-dimensional material information $X_3$ is collected by a material sensor. The 2-dimensional spectral information $X_1$ forms the image of the valuable document, the 1-dimensional magnetic information $X_2$ records the magnetic signal information which is collected during the valuable document passing, and the 1-dimensional material information $X_3$ records the thickness information which is collected during the valuable document passing.

1. The Semantic Constraint on the Spectral Information $X_1$ and the Magnetic Information $X_2$ For the valuable document, the spectral information $X_1$ is used for representing the image information of the valuable document, the magnetic information $X_2$ is used for representing the collected magnetic signal information of the magnetic carrier (e.g., magnetic security thread on the valuable document). The spectral information $X_1$ contains the optical imaging information of the magnetic carrier, the location "coordinate" of the magnetic carrier can be accurately determined by the spectral information $X_1$. Therefore, the magnetic sensor forms the semantic constraint on the spectral information $X_1$ and the magnetic information $X_2$ for the collecting point "coordinate" of the magnetic carrier on the valuable document, which can be specifically described by the following formula:

$$X_1 \cap X_2 \neq \phi \text{ and } X_1 <=> X_2; \quad (1)$$

Figure 4:
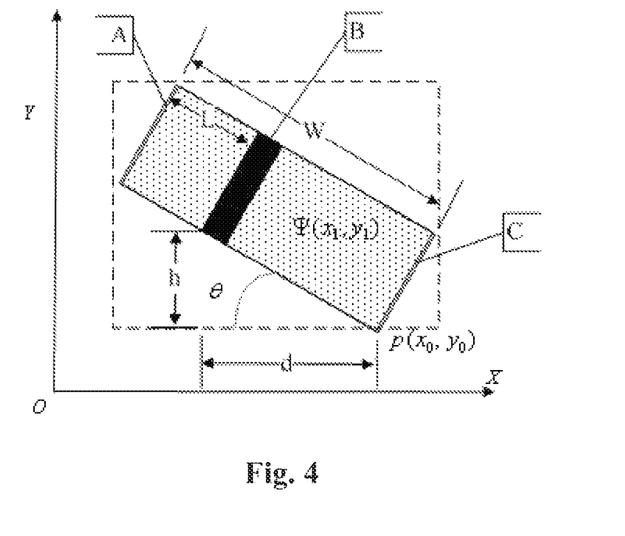
FIG. 4 is a schematic diagram of a semantic constraint on multi-source information of a valuable document provided by an embodiment of the present invention.

In FIG. 4, a schematic diagram of the semantic constraint on the multi-source information is shown, in which the black belt-shaped region (i.e., the region B) is the optical image of the magnetic security thread; and the inclined stripe region (i.e., the region A and the region C) is the optical image of the other portion in the valuable document. The magnetic information $X_2$ represents the magnetic signal information of the magnetic security thread, the optical imaging of the magnetic security thread is contained in the optical imaging $X_1$ of the whole valuable document, then $X_1 \cap X_2 \neq \phi$ and $X_1 <=> X_2$. Because the optical reflectivity of the magnetic security thread is low, the optical image thereof is the black belt-shaped region in FIG. 4, and the gray value thereof is significantly lower than that of the ambient region. The location of the magnetic security thread in the image can be determined by analyzing the variance in the gray value of the image. This is the inherent relation between the spectral information and the magnetic security thread (magnetic information) of the valuable document.

2. The Semantic Constraint on the Spectral Information $X_1$ and the Material Information $X_3$ The material information $X_3$ is used for representing the material thickness of the valuable document, and the spectral information $X_1$ contains the optical imaging information of various material thickness varying regions of the valuable document. The variance in the material thickness of the valuable document reflects onto the strength of the transmitted or reflected spectral energy, which is the inherent instinct relation between the spectral information and the material information. Therefore, the variance in the material thickness (i.e., the material information $X_3$) of the valuable document can be reflected by the spectral information $X_1$. The semantic constraint on the spectral information $X_1$ and the material information $X_3$ can be described by the following formula:

$$X_1 \cap X_3 \neq \phi \text{ and } X_1 <=> X_3; \quad (2)$$

As shown in FIG. 4, the optical imaging lightness value of the magnetic security thread, i.e., the region B, is low, and the optical imaging lightness value of the other regions, such as the regions A and C, is high. From the region A to the region B, the material of the valuable document varies, its corresponding optical imaging lightness value experiences the variation from "high" to "low"; and from the region B to the region C, the material of the valuable document varies, its corresponding optical imaging lightness value experiences the variation from "low" to "high". Therefore, the part of specific material on the valuable document can be accurately determined by the spectral information $X_1$.

3. The Semantic Constraint on the Magnetic Information $X_2$ and the Material Information $X_3$ The magnetic region in the valuable document has particular material characteristic, and the particularity of this region can be reflected by the material information $X_3$. The material information $X_3$ contains the thickness information of the magnetic carrier, and the semantic constraint on the magnetic information $X_2$ and the material information $X_3$ can be described by the following formula:

$$X_2 \cap X_3 \neq \phi; \quad (3)$$

As shown in FIG. 4, the thickness of the magnetic security thread (i.e., the region B) is much thicker than that of the ambient material. From the region A to the region B, their corresponding thickness values experience the variation from "low" to "high"; and from the region B to the region C, their corresponding thickness values experience the variation from "high" to "low".

Figure 5:
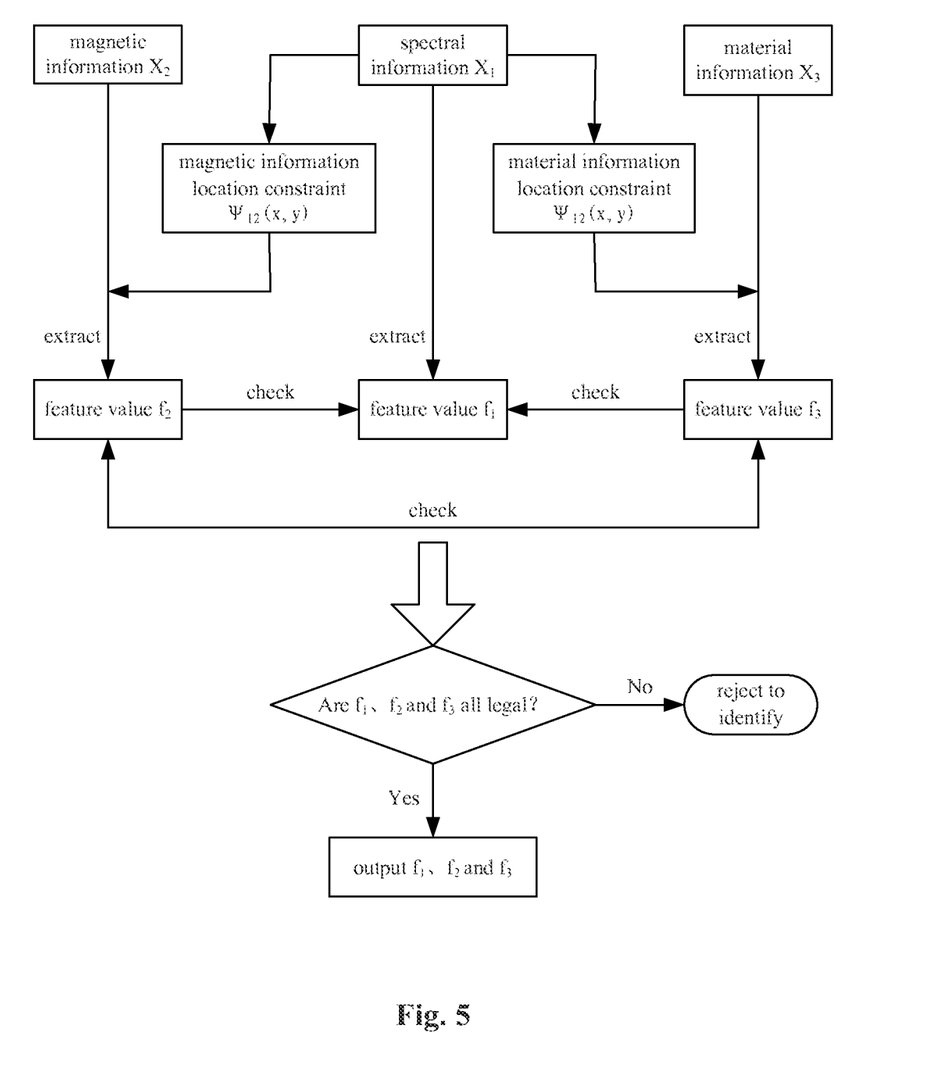
FIG. 5 is a schematic flow chart of a cooperative sensing portion in a method for to identifying valuable document provided by a second embodiment of the present invention.

Reference is made to FIG. 5, which is a schematic flow chart of a cooperative sensing portion of a method for identifying valuable document provided by a second embodiment of the present invention. According to the above three semantic constraints, i.e., the semantic constraints (1), (2) and (3), the cooperative sensing procedure of the valuable document is as follow.

S21. Determining a location of the magnetic carrier in the image according to the variety state of the image gray value of the spectral information $X_1$, and obtaining a magnetic information location constraint $\Psi_{12}(x,y)$;

S22. Determining locations of various materials in the image according to the variety state of the transmittance or refractive index in the spectral information $X_1$, and obtaining a material information location constraint $\Psi_{13}(x,y)$;

S31. Extracting a feature value $f_1$ from the spectral information $X_1$ based on a main component analyzing method;

S32. Extracting a feature value $f_2$ from the magnetic information $X_2$ based on the magnetic information location constraint $\Psi_{12}(x,y)$;

Specifically, the magnetic information location constraint $\Psi_{12}(x,y)$ determines the location of the magnetic carrier (e.g. the magnetic security thread) in the valuable document. The feature value $f_2$ of the magnetic carrier can be accurately extracted from the magnetic information $X_2$ based on the $\Psi_{12}(x,y)$. The feature value $f_2$ is the time sequence of the magnetic information.

S33. Extracting a feature value $f_3$ from the material information $X_3$ according to the material information location constraint $\Psi_{13}(x,y)$;

Specifically, the material information location constraint $\Psi_{13}(x,y)$ determines the locations of various materials in the valuable document, and the feature value $f_3$ of a certain material can be accurately extracted from the material information $X_3$ based on the $\Psi_{13}(x,y)$. For example, the material information $X_3$ is the thickness information, and the thickness of the magnetic security thread or the thickness of the paper material (such as the paper material other than the magnetic security thread) can be accurately extracted from the material information $X_3$ based on the $\Psi_{13}(x,y)$.

S34. Checking whether $f_2$ and $f_3$ conform to the semantic constraint on $X_2$ and $X_3$, and determining that $f_2$ and $f_3$ are legal if yes;

Because the production of the valuable document (such as banknote) complies with a strict technology standard, the spectral characteristic and the magnetic characteristic of the real banknote strictly comply with the standard value, without exceeding the range of the standard value. For example, the magnetic security thread of the banknote has specific magnetic information and thickness value. In this embodiment, according to the semantic constraint on $X_2$ and $X_3$, the feature values $f_2$ and $f_3$ is checked mutually to verify the legality of $f_2$ and $f_3$.

S35. In the case that $f_2$ and $f_3$ are legal, checking whether an correlation attribute among $f_1$, $f_2$ and $f_3$ conforms to the valuable document standard; and determining that $f_1$ is legal, if yes; and S36. Outputting $f_1$, $f_2$ and $f_3$, if $f_1$, $f_2$ and $f_3$ are all legal; else outputting a rejection identification.

Moreover, in the above flow of cooperative sensing valuable document, the location information of the magnetic information $X_2$ can also be determined by the material information $X_3$ to obtain the magnetic information location constraint $\Psi_{32}(x,y)$. After the feature values $f_1$, $f_2$ and $f_3$ are extracted based on the main component analyzing method, the legality of $f_2$ and $f_3$ can be verified by $\Psi_{12}(x,y)$, $\Psi_{13}(x,y)$, $\Psi_{32}(x,y)$, rather than by verifying whether $f_2$ and $f_3$ conform to the semantic constraint on $X_2$ and $X_3$. That is to say, the variable $f_2$ can be substituted into $\Psi_{12}(x,y)$, and $f_2$ is determined as legal when $\Psi_{12}(x,y)$ is satisfied. In the same way, the variable $f_3$ can be substituted into $\Psi_{13}(x,y)$ to check whether $f_3$ is legal; and variables $f_2$ and $f_3$ are substituted into $\Psi_{32}(x,y)$ to check the legality of $f_2$ and $f_3$.

The cooperative decision process in a method for identifying valuable document provided by a second embodiment of the present invention is as follow:

S41. Judging whether $f_1$ conforms to a real banknote spectral information data standard; performing S42 if yes, else performing S45;

S42. Judging whether $f_2$ conforms to a real banknote magnetic information data standard; performing S43 if yes, else performing S45;

S43. Judging whether $f_3$ conforms to a real banknote material information data standard; performing S44 if yes, else performing S45;

S44. Outputting a reception identification; and

S44. Outputting a rejection identification.

In the system for identifying valuable document, the valuable document that is transferred into the detection region is easily subject to abnormity, such as incline, misplacement, and fold. For example, as shown in FIG. 4, assuming that the detecting direction of the magnetic sensor is the y-axis direction, the location of the magnetic security thread is offset when the valuable document is inclined in the detecting region, and thus only a part of the magnetic information, even no magnetic information, can be collected by the magnetic sensor. Further, the material sensor for collecting the thickness of the magnetic security thread is fixedly mounted in the specific location, and thus the material information of the area other than the magnetic security thread will be collected by the material sensor if the valuable document in the detecting region is offset. In this way, if the identification is performed directly by the information collected by the sensor, rejecting to identify or false identifying can be caused in the system, and thus the reliability is lowered.

According to the method for identifying valuable document provided by the embodiment of the present invention, after the spectral information $X_1$, the magnetic information $X_2$ and the material information $X_3$ of the valuable document are obtained, the feature value $f_2$ of the magnetic carrier is extracted from the magnetic information $X_2$ according to the magnetic information location constraint $\Psi_{12}(x,y)$; and the feature value $f_3$ of a certain material is extracted from the material information $X_3$ according to the material information location constraint $\Psi_{13}(x,y)$. Even if the valuable document in the detecting region is easily subject to abnormity, such as incline, misplacement, fold, the optimal characteristics of the valuable document in different spatial scales can be extracted accurately, and the reliability of the system for identifying valuable document can be enhanced.

Figure 6:
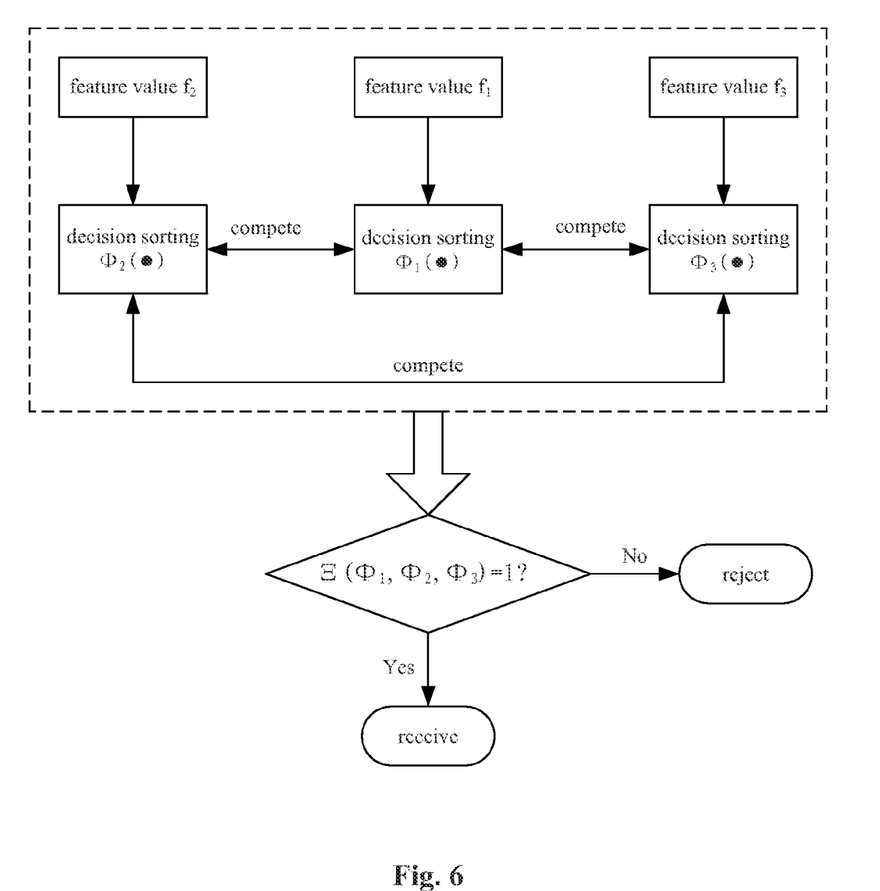
FIG. 6 is a schematic flow chart of a cooperative decision portion in a method for identifying valuable document provided by a second embodiment of the present invention.

In FIG. 6, a schematic flow chart of a more specific embodiment of the cooperative decision process is shown.

In this embodiment, the decision set $\Phi_1(\bullet)$, $\Phi_2(\bullet)$ and $\Phi_3(\bullet)$ is employed for indicating decision rules of individual identification sub-tasks, which are specifically as follows.

$\Phi_1(\bullet)$—spectral information reality deciding rule which indicates the match with the real banknote spectral information data standard. If $\Phi_1(\bullet)<T_1$, the current valuable document is rejected; and if $\Phi_1(\bullet)\geq T_1$, the current valuable document is received, in which $T_1$ is the preset threshold range of the spectral information.

$\Phi_2(\bullet)$—magnetic information reality deciding rule which indicates the match with the real banknote magnetic information data standard. If $\Phi_2(\bullet)<T_2$, the current valuable document is rejected; and if $\Phi_2(\bullet)\geq T_2$, the current valuable document is received, in which $T_2$ is the preset threshold range of the magnetic information.

$\Phi_3(\bullet)$—material information reality deciding rule which indicates the match with the real banknote material information data standard; if $\Phi_3(\bullet)<T_3$, the current valuable document is rejected; and if $\Phi_3(\bullet)\geq T_3$, the current valuable document is received, in which $T_3$, is the preset threshold range of the material information.

If the identification results of individual sub-tasks satisfy the cooperative rule $\Xi(\Phi_1, \Phi_2, \Phi_3)$, the "reception" identification is output; else the "rejection" identification is output. The cooperative rule is represented by the following formula:

$$\Xi(\bullet) = \begin{cases} 1 & \Phi_1 \geq T_1, \Phi_2 \geq T_2, \Phi_3 \geq T_3 \\ 0 & \text{other} \end{cases} \quad (4)$$

As shown in FIG. 6, the cooperative decision procedure is as follow.

I. Rejecting if no legal characteristic is extracted during the cooperative sensing process;

II. Substituting the individual spatial optimal feature values $f_1$, $f_2$, and $f_3$ into the cooperative decision rule $\Xi(\Phi_1, \Phi_2, \Phi_3)$, if the feature values $f_1$, $f_2$, and $f_3$ are extracted during the cooperative sensing process;

III. Stopping calculating other attributes to avoid an invalid calculation if any of $\Phi_1(f_1)<T_1$, $\Phi_2(f_2)<T_2$, and $\Phi_3(f_3)<T_3$ is satisfied, outputting the "rejection" identification, and turning to step V;

IV. Substituting $\Phi_i(f_i)(i=1, 2, 3)$ into the cooperative decision rule $\Xi$; outputting the "reception" identification if yes; else outputting the "rejection" identification; and V. Ending the calculation.

In the method for identifying valuable document provided by the present embodiment, by performing the collaborative decision, according to the local competition principle, different technical characteristics having semantic constraints provide mutually parameters for determining. When any one of the technical characteristics is determined as illegal, the calculation of the other attribute is stopped to avoid the invalid calculation, so as to improve the calculating efficiency. According to the global cooperative principle, mutual determination is performed on different characteristics to improve the reliability and accuracy of the system for identifying.

It is to be understood by those skilled in the art that all or a part of the processes in the above example method can be implemented by instructing related hardware with computer program, which can be stored in a computer readable storage medium, and the program when performed can include the procedure of the example of the above individual methods. The storage medium can be magnetic disk, optical disk, Read-Only Memory (ROM), Random Access Memory (RAM), or the like.

Correspondingly, the present invention further provides a system for identifying valuable document to achieve all the steps of the method for identifying valuable document in the above embodiment.

Figure 7:
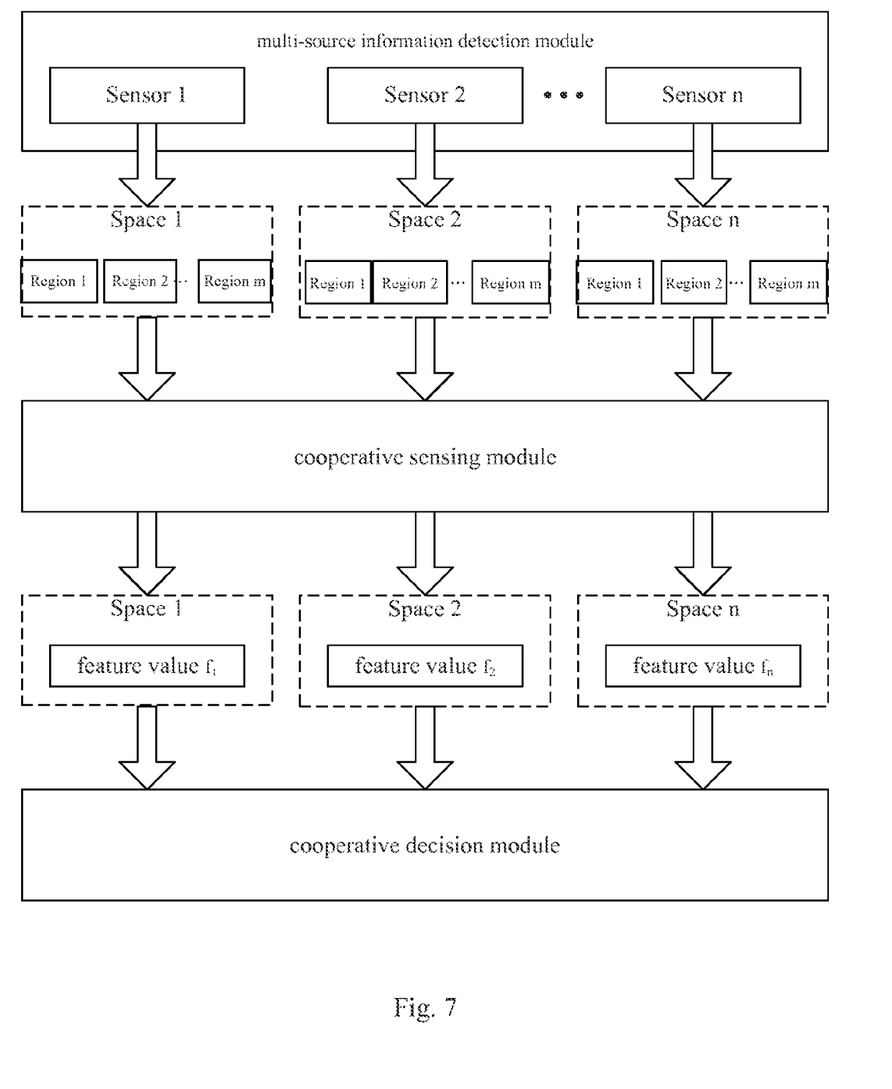
FIG. 7 is a schematic structural diagram of a system for identifying valuable document provided by a third embodiment of the present invention.

Reference is made to FIG. 7, which is a schematic structural diagram of an embodiment of a system for identifying valuable document provided by the present invention.

The system for identifying valuable document according to this embodiment includes:
- a multi-source information detecting module adapted for detecting characteristics of the valuable document in different spatial scales to obtain multi-source information $\Omega=\{X_i, X_j, \ldots, X_n\}$; where $X_i$ indicates the characteristic in the i-th space scale, $X_j$ indicates the characteristic in the j-th space scale, $1 \leq i \leq n$, $1 \leq j \leq n$, and $i \neq j$; semantic constraints on $X_i$ and $X_j$ are: $X_i \cap X_j \neq \phi$; or $X_i \cap X_j \neq \phi$ and $X_i \Longleftrightarrow X_j$;
- a cooperative sensing module adapted for determining a spatial location where $X_j$ is located with $X_i$ according to the semantic constraints on $X_i$ and $X_j$, and obtaining a location constraint $\Psi_{ij}(x,y)$; extracting a feature value $f_i$ from the $X_i$; and extracting a feature value $f_j$ from the $X_j$ according to the location constraint $\Psi_{ij}(x,y)$; and
- a cooperative decision module adapted for judging whether $f_i$ and $f_j$ conform to a characteristic standard of the valuable document; receiving the valuable document if yes; else rejecting the valuable document.

Specifically, the multi-source information detecting module includes:
- a spectral information detecting device adapted for obtaining spectral information $X_1$ of the valuable document;
- a magnetic information detecting device adapted for obtaining magnetic information $X_2$ of the valuable document; and
- a material information detecting device adapted for obtaining material information $X_3$ of the valuable document;

The spectral information $X_1$ is used for representing image information of the valuable document;

The magnetic information $X_2$ is used for representing magnetic signal information of a magnetic carrier of the valuable document, the spectral information $X_1$ contains optical imaging information of the magnetic carrier, and semantic constraints on $X_1$ and $X_2$ are: $X_1 \cap X_2 \neq \phi$ and $X_1 \Longleftrightarrow X_2$;

The material information $X_3$ is used for representing material thickness of the valuable document, the spectral information $X_1$ contains optical imaging information of various material thickness varying regions of the valuable document, and semantic constraints on $X_1$ and $X_3$ are: $X_1 \cap X_3 \neq \phi$ and $X_1 \Longleftrightarrow X_3$; and The material information $X_3$ contains thickness information of the magnetic carrier, and a semantic constraint on $X_2$ and $X_3$ is: $X_2 \cap X_3 \neq \phi$.

Specifically, the collaborative sensing module includes:
- a magnetic information location constraint processing unit adapted for determining a location of the magnetic carrier in the image according to the variety state of the image gray value of the spectral information $X_1$ to obtain a magnetic information location constraint $\Psi_{12}(x,y)$; and the magnetic information location constraint processing unit also adapted for determining a location of magnetic information $X_2$ according to the material information $X_3$ to obtain magnetic information location constraint $\Psi_{32}(x,y)$;
- a material information location constraint processing unit adapted for determining locations of various materials in the image according to the variety state of the transmittance or refractive index in the spectral information $X_1$, and obtaining a material information location constraint $\Psi_{13}(x,y)$;
- a spectral characteristic extracting unit adapted for extracting a feature value $f_1$ from the spectral information $X_1$ based on a main component analyzing method;
- a magnetic characteristic extracting unit adapted for extracting a feature value $f_2$ from the magnetic information $X_2$ based on the magnetic information location constraint $\Psi_{12}(x,y)$;
- a material characteristic extracting unit adapted for extracting a feature value $f_3$ from the material information $X_3$ according to the material information location constraint $\Psi_{13}(x,y)$; and
- a feature value legality judging unit adapted for checking whether $f_2$ and $f_3$ conform to the semantic constraint on $X_2$ and $X_3$, and if yes, determining that $f_2$ and $f_3$ are legal and checking whether an associate attribute among $f_1$, $f_2$ and $f_3$ conform to the valuable document standard; if the associate attribute among $f_1$, $f_2$ and $f_3$ conform to the valuable document standard, determining that $f_1$ is legal and outputting $f_1$, $f_2$ and $f_3$; else outputting an rejection identification.

Specifically, the cooperative decision module includes:
- a spectral information realness judging unit adapted for judging whether $f_1$ conforms to a real banknote spectral information data standard;
- a magnetic information realness judging unit adapted for judging whether $f_2$ conforms to a real banknote magnetic information data standard;
- a material information realness judging unit adapted for judging whether $f_3$ conforms to a real banknote material information data standard; and
- a synthetic decision unit adapted for outputting an identification of receiving the valuable document if $f_1$, $f_2$, and $f_3$ all conform to the standard; else outputting an identification of rejecting the valuable document.

According to the method and the system for identifying valuable document provided by the embodiment of the present invention, the multi-source information is obtained and the context scene of the multi-source information is established by detecting characteristics of the valuable documents in different spatial scales; the cooperative process is performed on the multi-source information of the valuable document by using the context constraint on the multi-source information during the identifying process, the covering range of the system is expanded, the information of the detected object is obtained with higher accuracy and reliability, the consistent explanation and description of the detected object is established more accurately, the reliability and the robustness of the system for identifying valuable document is enhanced, and the calculating efficiency of the system is improved.

The above are the preferred embodiments of the present invention, it is to be noted that, several modifications and retouches can be made by those skilled in the art without deviating from the principle of the present invention, which are also seemed as within the scope of protection of the present invention.

What is claimed is:

1. A method for identifying valuable document, comprising:
   S1. detecting characteristics of the valuable document in different spatial scales to obtain multi-source information $\Omega=\{X_i, X_j, \ldots, X_n\}$,
   wherein $X_i$ indicates the characteristic in the i-th space scale, $X_j$ indicates the characteristic in j-th space scale, $1 \leq i \leq n$, $1 \leq j \leq n$, and $i \neq j$; semantic constraints on $X_i$ and $X_j$ are: $X_i \cap X_j \neq \phi$;

S2. determining a spatial location of $X_j$ by using $X_i$ to obtain a location constraint $\Psi_{ij}(x,y)$ according to the semantic constraints on $X_i$ and $X_j$;

S3. extracting a feature value $f_i$ from the $X_i$; and extracting a feature value $f_j$ from the $X_j$ according to the location constraint $\Psi_{ij}(x,y)$, checking whether $f_i$ and $f_j$ conform to the semantic constraint on $X_i$ and $X_j$, determining that $f_i$ and $f_j$ are legal if yes; else outputting a rejection identification wherein $f_i$ is an optimal characteristic of the i-th spatial scale, and $f_j$ is an optimal characteristic of the j-th spatial scale; and S4. judging whether $f_i$ and $f_j$ conform to a characteristic standard of the valuable document; outputting the reception identification to receive the valuable document if yes; else outputting the rejection identification to reject the valuable document, wherein the multi-source information comprises spectral information $X_1$, magnetic information $X_2$ and material information $X_3$, wherein the spectral information $X_1$ is adapted for representing image information of the valuable document;

the magnetic information $X_2$ is adapted for representing magnetic signal information of a magnetic carrier of the valuable document, the spectral information $X_1$ contains optical imaging information of the magnetic carrier, and semantic constraints on $X_1$ and $X_2$ are: $X_1 \cap X_2 \neq \phi$;

the material information $X_3$ is adapted for representing material thickness of the valuable document, the spectral information $X_1$ contains optical imaging information of various material thickness variety regions of the valuable document, and semantic constraints on $X_1$ and $X_3$ are: $X_1 \cap X_3 \neq \phi$; and the material information $X_3$ contains thickness information of the magnetic carrier, and a semantic constraint on $X_2$ and $X_3$ is: $X_2 \cap X_3 \neq \phi$.

2. The method for identifying valuable document according to claim 1, wherein the semantic constraint on $X_i$ and $X_j$ are $X_i \cap X_j \neq \phi$ and $X_i <=> X_j$.

3. The method for identifying valuable document according to claim 2, wherein the multi-source information comprises spectral information $X_1$, magnetic information $X_2$ and material information $X_3$;

the spectral information $X_1$ is adapted for representing image information of the valuable document;

the magnetic information $X_2$ is adapted for representing magnetic signal information of a magnetic carrier of the valuable document, the spectral information $X_1$ contains optical imaging information of the magnetic carrier, and semantic constraints on $X_1$ and $X_2$ are: $X_1 \cap X_2 \neq \phi$ and $X_1 <=> X_2$;

the material information $X_3$ is adapted for representing material thickness of the valuable document, the spectral information $X_1$ contains optical imaging information of various material thickness variety regions of the valuable document, and semantic constraints on $X_i$ and $X_3$ are: $X_1 \cap X_3 \neq \phi$ and $X_1 <=> X_3$; and the material information $X_3$ contains thickness information of the magnetic carrier, and a semantic constraint on $X_2$ and $X_3$ is: $X_2 \cap X_3 \neq \phi$.

4. The method for identifying valuable document according to claim 1, wherein the step S2 comprises:

determining a location of the magnetic carrier in the image according to the variety state of the image gray value of the spectral information $X_1$, and obtaining a magnetic information location constraint $\Psi_{12}(x,y)$; and determining locations of various materials in the image according to the variety state of the transmittance or refractive index in the spectral information $X_1$, and obtaining a material information location constraint $\Psi_{13}(x,y)$.

5. The method for identifying valuable document according to claim 4, wherein the step 2 further comprises:

determining the location of magnetic information according to the material information $X_3$, and obtaining a magnetic information location constraint $\Psi_{32}(x,y)$.

6. The method for identifying valuable document according to claim 1, wherein the step S3 comprises:

S31. extracting a feature value $f_1$ from the spectral information $X_1$ based on a main component analyzing method;

S32. extracting a feature value $f_2$ from the magnetic information $X_2$ according to the magnetic information location constraint $\Psi_{12}(x,y)$ based on the main component analyzing method;

S33. extracting a feature value $f_3$ from the material information $X_3$ according to the material information location constraint $\Psi_{13}(x,y)$ based on the main component analyzing method;

S34. checking whether $f_2$ and $f_3$ conform to the semantic constraint on $X_2$ and $X_3$, and determining that $f_2$ and $f_3$ are legal if yes;

S35. in the case that $f_2$ and $f_3$ are legal, checking whether an associate attribute among $f_1$, $f_2$ and $f_3$ conform to the valuable document standard; and if yes, determining that $f_1$ is legal; and S36. outputting $f_1$, $f_2$ and $f_3$, if $f_1$, $f_2$ and $f_3$ are all legal; else outputting a rejection identification.

7. The method for identifying valuable document according to claim 6, wherein the valuable document is real banknote and the step S4 comprises:

S41. judging whether $f_1$ conforms to a real banknote spectral information data standard; performing S42 if yes, else performing S45;

S42. judging whether $f_2$ conforms to a real banknote magnetic information data standard; performing S43 if yes, else performing S45;

S43. judging whether $f_3$ conforms to a real banknote material information data standard; performing S44 if yes, else performing S45; and S44. outputting a reception identification.

8. A system for identifying valuable document, comprising: a cooperative decision module adapted for judging whether fi and f3 conform to a characteristic standard of the valuable document; outputting a reception identification to receive the valuable document if yes; else outputting a rejection identification to reject the valuable document;

wherein the multi-source information comprises spectral information X1: magnetic information X2 and material information X3, wherein the spectral information X1 is adapted for representing image information of the valuable document;

the magnetic information $X_2$ is adapted for representing magnetic signal information of a magnetic carrier of the valuable document, the spectral information $X_1$ contains optical imaging information of the magnetic carrier, and semantic constraints on $X_1$ and $X_2$ are: $X_1 \cap X_2 \neq \phi$;

the material information $X_3$ is adapted for representing material thickness of the valuable document, the spectral information $X_1$ contains optical imaging information of various material thickness variety regions of the valuable document, and semantic constraints on $X_1$ and $X_3$ are: $X_1 \cap X_3 \neq \phi$; and the material information $X_3$ contains thickness information of the magnetic carrier, and a semantic constraint on $X_2$ and $X_3$ is: $X_2 \cap X_3 \neq \phi$.

9. The system for identifying valuable document according to claim 8, wherein the multi-source information detecting module adapted for defining the semantic constraints on $X_i$ and $X_j$ are: $X_i \cap X_j \neq \phi$, and $X_i <=> X_j$ after obtaining the multi-source information $\Omega = \{X_i, X_j, \ldots, X_n\}$; then the semantic constraints on the spectral information $X_1$ obtained by the spectral information detecting device and the magnetic information $X_2$ obtained by the magnetic information detecting device are: $X_1 \cap X_2 \neq \phi$ and $X_1 <=> X_2$; and the semantic constraints on the spectral information $X_1$ obtained by the spectral information detecting device and the material information $X_3$ obtained by the material information detecting device are: $X_1 \cap X_3 \neq \phi$ and $X_1 <=> X_3$.

10. The system for identifying valuable document according to claim 8, wherein the cooperative sensing module comprises:

a magnetic information location constraint processing unit adapted for determining a location of the magnetic carrier in the image according to the variety state of the image gray value of the spectral information $X_i$, and obtaining a magnetic information location constraint $\Psi_{12}(x,y)$; and a material information location constraint processing unit adapted for determining locations of various materials in the image according to the variety state of the transmittance or refractive index in the spectral information $X_1$, and obtaining a material information location constraint $\Psi_{13}(x,y)$.

11. The system for identifying valuable document according to claim 10, wherein the magnetic information location constraint processing unit adapted for determining the location of magnetic information according to the material information $X_3$, and obtaining a magnetic information location constraint $\Psi_{32}(x,y)$.

12. The system for identifying valuable document according to claim 8, wherein the cooperative sensing module further comprises:

a spectral characteristic extracting unit adapted for extracting a feature value $f_1$ from the spectral information $X_1$ based on a main component analyzing method;

a magnetic characteristic extracting unit adapted for extracting a feature value $f_2$ from the magnetic information $X_2$ according to the magnetic information location constraint $\Psi_{12}(x,y)$ based on the main component analyzing method;

a material characteristic extracting unit adapted for extracting a feature value $f_3$ from the material information $X_3$ according to the material information location constraint $\Psi_{13}(x,y)$ based on the main component analyzing method; and a feature value legality judging unit adapted for checking whether $f_2$ and $f_3$ conform to the semantic constraint on $X_2$ and $X_3$; if yes, determining that $f_2$ and $f_3$ are legal and checking whether an associate attribute among $f_1$, $f_2$ and $f_3$ conform to the valuable document standard; if the associate attribute among $f_1$, $f_2$ and $f_3$ conform to the valuable document standard, determining that $f_1$ is legal and outputting $f_1$, $f_2$ and $f_3$; else outputting the rejection identification.

13. The system for identifying valuable document according to claim 12, wherein the valuable document is real banknote, and the cooperative decision module comprises:

a spectral information realness judging unit adapted for judging whether $f_1$ conforms to a real banknote spectral information data standard;

a magnetic information realness judging unit adapted for judging whether $f_2$ conforms to a real banknote magnetic information data standard;

a material information realness judging unit adapted for judging whether $f_3$ conforms to a real banknote material information data standard; and a synthetic decision unit adapted for outputting the reception identification if $f_1$, $f_2$, and $f_3$ all conform to the standard; else outputting a rejection identification.

* * * * *

UNITED STATES PATENT AND TRADEMARK OFFICE
CERTIFICATE OF CORRECTION

PATENT NO. : 9,014,458 B2  
APPLICATION NO. : 13/879019  
DATED : April 21, 2015  
INVENTOR(S) : Tiancai Liang et al.

Page 1 of 1

It is certified that error appears in the above-identified patent and that said Letters Patent is hereby corrected as shown below:

In the Specification

Column 1, line 63, delete "$1 \leq i \leq n \leq$" and insert -- $1 \leq i \leq n$ --.

In the Claims

Column 11, line 57, delete "$X_i$;" and insert -- $X_1$ --.

Column 12, line 48, insert -- a multi-source information detecting module adapted for detecting characteristics of the valuable document in different spatial scales to obtain multi-source information $\Omega = \{X_i, X_j, \ldots, X_n\}$; wherein $X_i$ indicates the characteristic in the i-th space scale, $X_j$ indicates the characteristic in the j-th space scale, $1 \leq i \leq n$, $1 \leq j \leq n$, and $i \neq j$; semantic constraints on $X_i$ and $X_j$ are: $X_i \cap X_j \neq \varphi$; a cooperative sensing module adapted for determining a spatial location of $X_j$ by using $X_i$ according to the semantic constraints on $X_i$ and $X_j$ to obtain a location constraint $\Psi_{ij}(x,y)$; extracting a feature value from $f_i$ from $X_i$; and extracting a feature value $f_j$ from the $X_j$ according to the location constraint $\Psi_{ij}(x,y)$, checking whether $f_i$ and $f_j$ conform to the semantic constraint on $X_i$ and $X_j$, determining that $f_i$ and $f_j$ are legal if yes; else outputting a rejection identification, wherein $f_i$ is an optimal characteristics of the i-th spatial scale, and $f_j$ is an optimal characteristics of the j-th spatial scale; and --.

Column 12, line 49, delete "$f_3$" and insert -- $f_j$ --.

Column 13, line 27, delete "$X_i$;" and insert -- $X_1$ --.

Signed and Sealed this  
Twenty-second Day of September, 2015

Michelle K. Lee  
*Director of the United States Patent and Trademark Office*